United States Patent
Fort et al.

[11] Patent Number: 5,842,450
[45] Date of Patent: Dec. 1, 1998

[54] FUEL REGULATOR RETAINING CLIP

[75] Inventors: William Beal Fort, Dearborn; Candace Glasgow, Westland; Doug Patton, Canton; Anthony Horvath, Temperance; James Braden Roberts, Dearborn; Edward John Vinarcik, Ann Arbor, all of Mich.

[73] Assignee: Ford Motor Company, Dearborn, Mich.

[21] Appl. No.: 58,976

[22] Filed: Apr. 13, 1998

[51] Int. Cl.⁶ .......................... F02M 37/04; F02M 41/00; F16K 31/12
[52] U.S. Cl. .......................... 123/463; 123/456; 137/510
[58] Field of Search .................... 123/468, 469, 123/463, 456, 470; 137/510; 285/305

[56] References Cited

U.S. PATENT DOCUMENTS

| | | | |
|---|---|---|---|
| 4,244,608 | 1/1981 | Stuemky | 285/305 |
| 4,307,693 | 12/1981 | Glockler et al. . | |
| 4,357,921 | 11/1982 | Ciaccio | 123/463 |
| 4,475,516 | 10/1984 | Atkins et al. . | |
| 4,539,961 | 9/1985 | Atkins et al. . | |
| 4,653,528 | 3/1987 | Field | 137/510 |
| 4,660,598 | 4/1987 | Butterfield | 137/510 |
| 4,756,289 | 7/1988 | Rock | 123/463 |
| 5,035,224 | 7/1991 | Hornby et al. . | |
| 5,038,738 | 8/1991 | Hafner et al. . | |
| 5,040,512 | 8/1991 | Twilton . | |
| 5,058,554 | 10/1991 | Takeda et al. . | |
| 5,070,844 | 12/1991 | Daly . | |
| 5,088,463 | 2/1992 | Affelot | 123/447 |
| 5,092,300 | 3/1992 | Imoehl et al. . | |
| 5,094,211 | 3/1992 | Mahnke | 123/463 |
| 5,111,794 | 5/1992 | DeGrace, Jr. . | |
| 5,146,896 | 9/1992 | Imoehl et al. . | |
| 5,275,443 | 1/1994 | Klinger | 285/305 |
| 5,301,647 | 4/1994 | Lorraine . | |
| 5,394,850 | 3/1995 | Murphy et al. . | |
| 5,405,175 | 4/1995 | Bonnah, II et al. . | |
| 5,429,094 | 7/1995 | Akida | 137/510 |
| 5,520,151 | 5/1996 | Gras et al. . | |
| 5,551,400 | 9/1996 | Rice et al. . | |
| 5,609,138 | 3/1997 | Mutschler . | |
| 5,680,703 | 10/1997 | Ono | 137/510 |
| 5,720,263 | 2/1998 | Frank | 37/510 |

Primary Examiner—Carl S. Miller
Attorney, Agent, or Firm—Neil P. Ferraro

[57] ABSTRACT

A retaining clip includes a cantilever arm which engages an exterior tab affixed to the outer surface of the retaining clip. The inner surface of the cantilever arm and the outer surface of the engaging tab both include a number of serrated catches. The catches are situated such that the inner surface catches of the cantilever arm are opposing the outer surface catches of the engaging tab. When the retaining clip is engaged, the serrated catches form a secure mesh. The retaining clip also includes a latch which further secures the engaged clip while also providing a means of unfastening the clip without specialized tools.

15 Claims, 2 Drawing Sheets

FUEL REGULATOR RETAINING CLIP

FIELD OF THE INVENTION

This invention relates to a fastening device, and, more particularly to, a pliable retaining clip which secures a fuel regulator to an automotive fuel rail.

BACKGROUND OF THE INVENTION

Fuel rails are currently being designed to include button style fuel regulators. In a typical embodiment, a fuel rail will include a chrome plated pressure regulator receiving housing. The fuel regulator is then inserted into the housing and a steel spring lock ring or C-clip is used to retain the regulator in the housing.

The inventors of the present invention have found certain disadvantages with these prior art methods of securing a fuel regulator to a fuel rail. One effect, galvanic corrosion, may result between the chrome fuel rail and steel lock ring or C-clip. In addition, the use of the spring lock ring or C-clip requires the use of special installation tools. Further, the geometry of the deep drawn cup within the receiving housing is highly complex and tolerances are extremely tight. The use of a C-clip has been found to be anything but ideal for assembly purposes resulting in increased material and labor expenditures. Examples of these prior art systems are illustrated in U.S. Pat. Nos. 5,146,896 and 5,609,138.

SUMMARY OF THE INVENTION

An object of the present invention is to provide a low cost, easy to assemble, means for fastening a fuel regulator to a fuel rail assembly.

This object is achieved, and disadvantages of prior art approaches are overcome, by providing a novel retaining clip for securing a fuel regulator to an automotive fuel rail assembly. In one particular aspect of the invention, the retaining clip includes a cantilever arm which engages an exterior tab affixed to the outer surface of the retaining clip. The inner surface of the cantilever arm and the outer surface of the engaging tab both include a number of serrated catches. The catches are situated such that the inner surface catches of the cantilever arm are opposing the outer surface catches of the engaging tab. When the retaining clip is engaged, the serrated catches form a secure mesh. The retaining clip also includes a latch which further secures the engaged clip while also providing a means of unfastening the clip without specialized tools. In a preferred embodiment, the retaining clip is made of a non-metallic material such as plastic.

In another aspect of the invention, the retaining includes an annularly formed body, a cylindrical wall extending axially from the outer circumference of the annularly formed body, and a plurality of cantilever arms extending axially from the cylindrical wall. The cantilever arms has a proximal portion and a distal portion. The arms engage the lips of the fuel rail and the fuel regulator when the retaining clip is inserted thereon.

An advantage of the present invention is that the required geometry of the fuel rail's deep drawn cup is relatively simple and manufactured easily.

Another advantage of the present invention is that corrosion is significantly reduced by covering the fuel regulator and deep drawn cup interface.

Another, more specific, advantage of the present invention is that galvanic corrosion is significantly reduced by covering the fuel regulator and deep drawn cup interface with a non-metallic clip.

Another, more specific, advantage of the present invention is that the retaining clip presents a barrier between the fuel regulator and deep drawn cup interface and the environment, preventing large amounts of residue from the penetrating the interface.

Still another advantage of the present invention is that retaining clip assembly and detachment times are significantly reduced.

Another advantage of the present invention is that a simpler, lower cost means of securing a fuel regulator to a fuel rail is achieved.

Other objections, features and advantages of the present invention will be readily appreciated by the reader of this specification.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
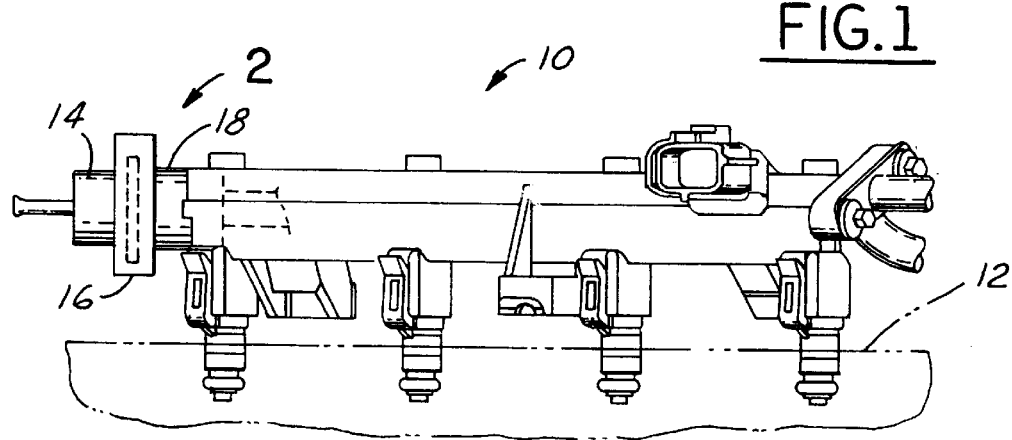
FIG. 1 is a diagrammatic representation of a fuel delivery system including a retaining clip securing a fuel regulator to a fuel rail according to the present invention.

Fuel delivery system 10, shown in FIG. 1, delivers fuel to internal combustion engine 12. Fuel delivery system 10, includes fuel regulator 14, which regulates the fuel pressure within fuel delivery system 10. Retaining clip 16, secures fuel regulator 14 to deep drawn cup portion 18 of fuel delivery system 10.

Figure 4:
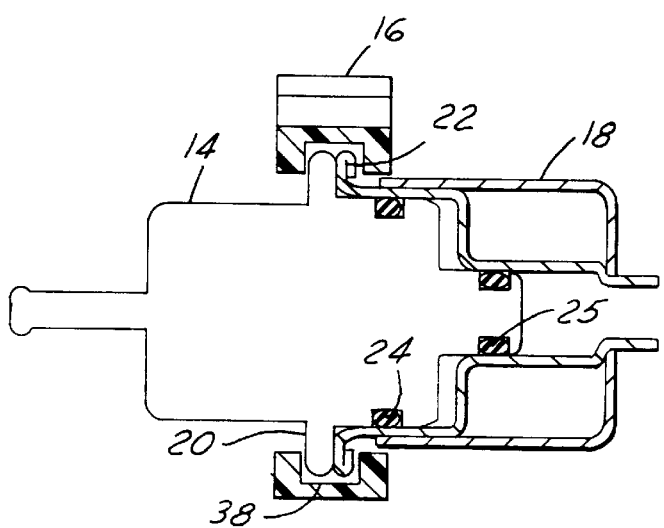
FIG. 4 is a cross-sectional view of the retaining clip taken along line 4—4 in FIG. 3.

As shown in FIG. 4, fuel regulator 14 and deep drawn cup 18 both include a radially directed outward lip 20 and 22, respectively. When fuel regulator 14 is fully seated into deep drawn cup 18, the two circumferential surfaces of lips 20 and 22 abut against one another. O-rings 24 and 25 provide a seal preventing fuel from leaking past fuel regulator 14. Retaining clip 16 is implemented to envelop lips 20 and 22, and thereby securing fuel regulator 14 to deep drawn cup 18.

Retaining clip 16 will now be described with reference to FIGS. 2–6. Retaining clip 16 has an annularly formed body 16a having first arcuate leg 26, which includes first end 26a and second end 26b. Second arcuate leg 28 includes first end 28a and second end 28b.

Figure 3:
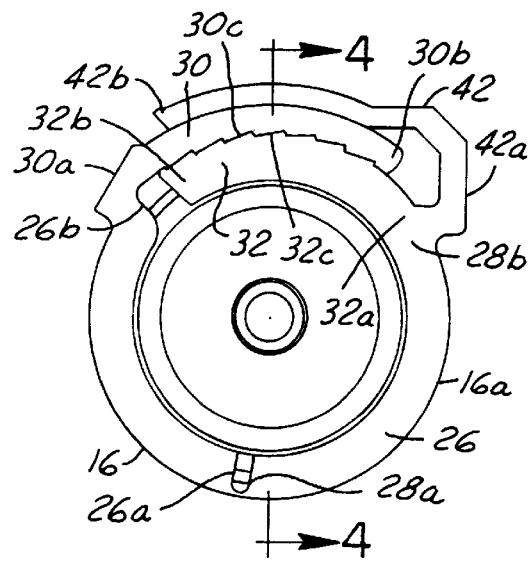
FIG. 3 is an end view of the retaining clip of FIG. 2.

Retaining clip 16 further includes cantilever arm 30 and tab 32. Cantilever arm 30 includes proximal portion 30a which lies adjacent to second end 26b of first leg 26 and distal portion 30b. Cantilever arm 30 extends away from proximal portion 30a in a circumferential manner. Inner surface 30c of cantilever arm 30 includes a plurality of serrated catches 34 (see FIG. 6) which incline away from distal portion 30b. Tab 32 includes proximal portion 32a, which lies adjacent to second end 28b of second leg 28, and distal portion 32b. Tab 32 extends away from proximal portion 32a in a circumferential manner. Outer surface 32c of tab 32 includes a plurality of serrated catches 36 (see FIG. 6), which incline away from its distal portion 32b. Serrated catches 34 and 36 are formed such that when cantilever arm 30 is engaging tab 32, the catches bias cantilever arm 30 away from tab 32, allowing for easy installation of retaining clip 16. Once cantilever arm 30 has fully engaged tab 32, thereby securing cantilever arm 30 to tab 32, distal portion 30b of cantilever arm 30 will lie substantially adjacent to proximal portion 32a of tab 32, and distal portion 32b of tab 32 will lie substantially adjacent to proximal portion 30a of cantilever arm 30, as best shown in FIG. 3.

Catches 34 and 36 are symmetrically fashioned, such that when cantilever arm 30 has fully engaged tab 32, an equal and opposite force will be applied to opposing catches 34 and 36, ensuring a secure mesh. Catches 34 and 36 are aligned along a longitudinal axis of annularly formed body 16a and encompass the full axial length of cantilever arm 30 and tab 32, respectively. It will be readily apparent to those skilled in the art that the quantity and design of catches 34 and 36 can be varied to meet a particular design criterion.

Figure 5:
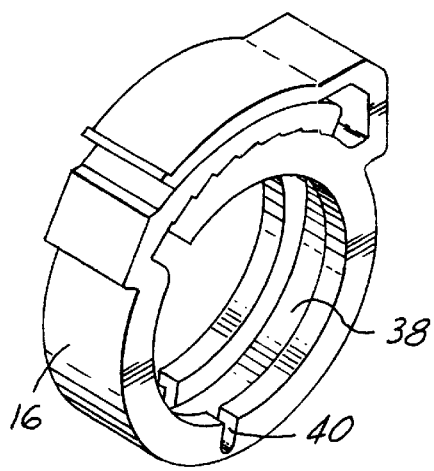
FIG. 5 is a perspective view of the retaining clip shown in a closed position.

As best shown in FIGS. 4 and 5, retaining clip 16 includes channel 38, which extends throughout the inner surfaces of first leg 26, second leg 28, and tab 32. When fuel regulator 14 is fully seated within deep drawn cup portion 18 and retaining clip 16 is attached thereto, channel 38 coordinates with and encloses lips 20 and 22. Those skilled in the art will recognize that channel 38 can be formed in various geometrical configurations to meet a particular lip design.

Figure 6:
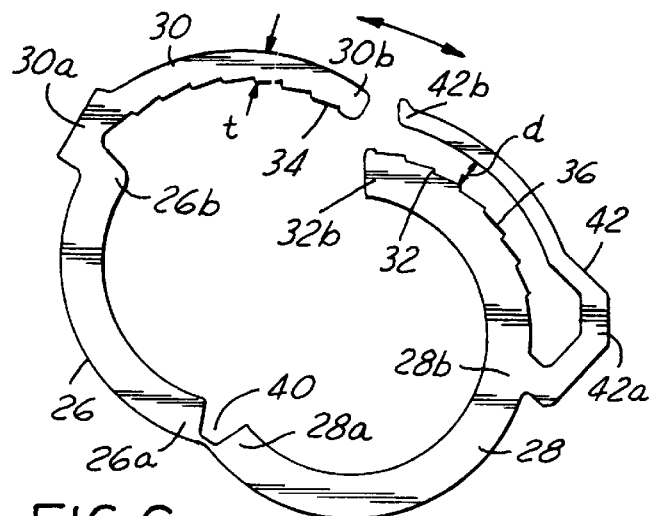
FIG. 6 is a side view of the retaining clip shown in an open position.
Figure 7:
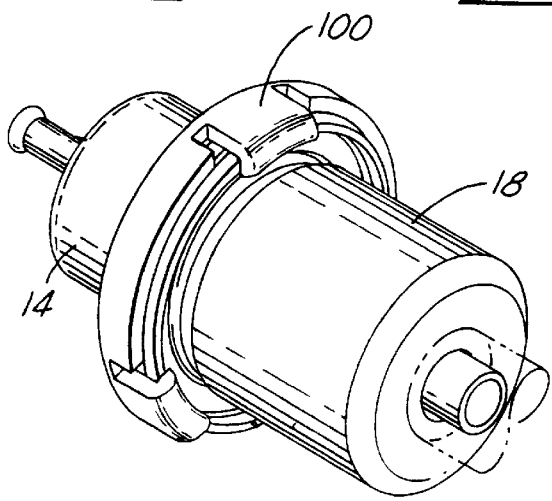
FIG. 7 is perspective view of an alternative embodiment of a retaining clip securing a fuel regulator to the deep drawn cup of a fuel rail according to the present invention.
Figure 8:
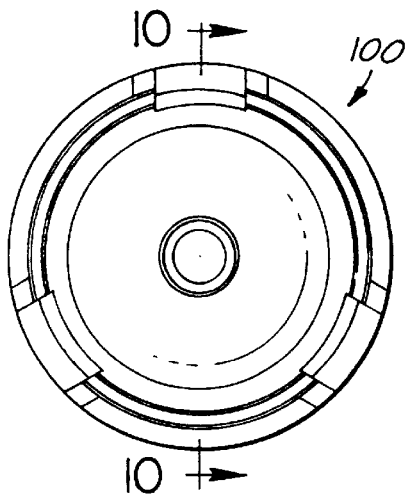
FIG. 8 is an end view of the alternative embodiment of the retaining clip of FIG. 7.

As best shown in FIGS. 5 and 6, retaining clip 16 also includes axially extending notch 40. Notch 40 is located at an intersection of first leg 26 and second leg 28 adjacent first ends 26a and 28a. Notch 40 allows retaining clip 16 to separate and flex. In a preferred embodiment, notch 40 will be located such that first leg 26 and second leg 28 have similar arcuate lengths so that retaining clip 16 can flex into a maximal unsecured orientation, furthering the ease of applying and detaching retaining clip 16.

Figure 2:
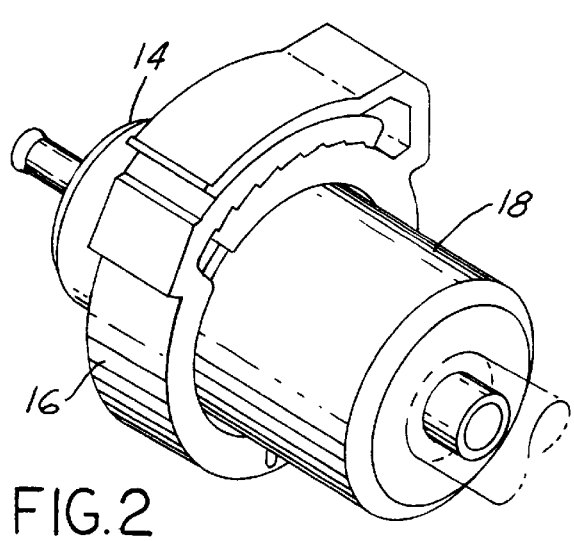
FIG. 2 is a perspective view of the retaining clip securing a fuel regulator to the deep drawn cup of a fuel rail according to the present invention.

In a preferred embodiment, retaining clip 16 will include a bracing latch 42 formed to tab 32. Latch 42 includes proximal portion 42a and distal portion 42b. Proximal portion 42a is located adjacent to second end 28b of second leg 28. Latch 42 extends in a circumferential manner away from proximal portion 42a. Once retaining clip 16 is fully engaged such that arm 30 engages tab 32, distal portion 42b of latch 42 will lie adjacent to proximal portion 30a of cantilever arm 30, as shown in FIGS. 2 and 3. As shown in FIG. 6, the spacing (d) between latch 42 and tab 32 is less than the thickness (t) of arm 30 such that, when fully engaged, latch 42 will apply a radially inward force along the outer surface of cantilever arm 30, further securing cantilever arm 30 to tab 32.

Figure 9:
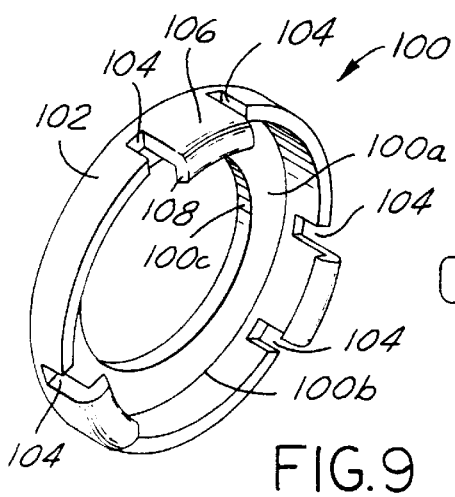
FIG. 9 is a perspective view of the alternative embodiment of the retaining clip; and, FIG. 10 is a cross-sectional view of the alternative embodiment of the retaining clip taken along line 10—10 in FIG. 8.

In an alternative embodiment, as shown in FIGS. 7–10, retaining clip 100 has an annularly formed body 100a. As best shown in FIG. 9, cylindrical wall 102 extends axially from the outer circumference 100b of annular body 100a. Symmetrically dispersed openings 104 are formed within wall 102. Cantilever arms 106 are located centrally within openings 104 and extend axially from proximal portions 106a, terminating at distal portions 106b. Distal portions 106b include a radially inward directed tab 108.

Figure 10:
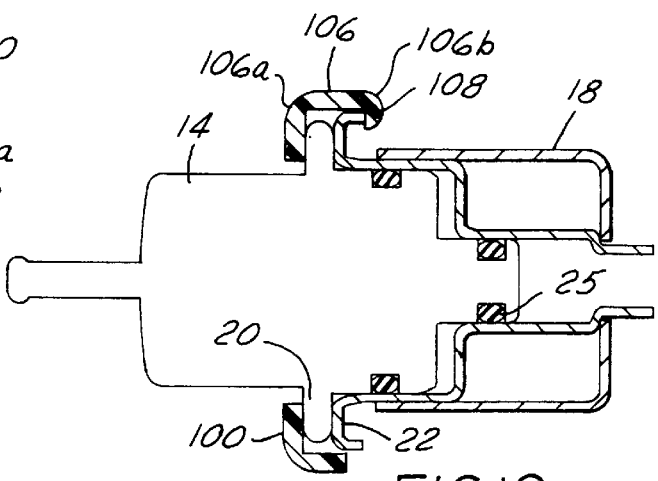

As best shown in FIG. 10, once fuel regulator 14 is fully seated within deep drawn cup 18, retaining clip 100 is inserted onto fuel regulator 14 until the tabs 108 of cantilever arms 106 have engaged deep drawn cup lip 22. Outer circumference 100b of retaining clip 100 is formed to equal the circumferential extent of deep drawn cup lip 22. The lengths of cantilever arms 106 are designed such that when retaining clip 100 is engaged, proximal portion 106a will lie adjacent to fuel regulator lip 20 and distal portion 106b will lie adjacent deep drawn cup lip 22, effectively securing fuel regulator 14 to deep drawn cup 18. Inner circumference 100c of annular body 100a is formed such that retaining clip 100 may be easily installed and removed from fuel regulator 14. In a preferred embodiment, as best shown in FIG. 10, tabs 108 will be formed in an inclined manner, such that when attaching retaining clip 100, cantilever arms 106 are biased outward, allowing for easy attachment of retaining clip 100 to deep drawn cup 18. In a preferred embodiment, also shown in FIG. 10, cylindrical wall 102 is extended to encompass fuel regulator and deep drawn cup lips, 20 and 22, respectively.

While the best mode for carrying out the invention has been described in detail, those skilled in the art in which this invention relates will recognize various alternative designs and embodiments, including those mentioned above, in practicing the invention that has been defined by the following claims.

We claim:

1. A pliable retaining clip for securing a fuel regulator having a radially outward directed lip to a fuel rail, also having a radially outward directed lip, said retaining clip, when attached, having an axis that is coincident with the axis of the fuel regulator and the fuel rail, said retaining clip comprising:

a first arcuately shaped leg having a first end, a second end, an inner surface and an outer surface;

a second arcuately shaped leg having a first end, a second end, an inner surface and an outer surface, with said first and said second legs being joined together at said first ends;

a channel formed in said inner surfaces of said first and second legs, with said channel being adapted to engage with the lips of the fuel regulator and the fuel rail;

a cantilever arm extending from said outer surface of said first leg at said second end thereof, with said cantilever arm comprising a proximal portion and a distal portion, with said proximal portion being formed adjacent said second end of said first leg;

a tab extending along said outer surface of said second leg for cooperating with said cantilever arm to engage thereto, with said tab comprising a proximal portion and a distal portion, with said proximal portion being formed adjacent said second end of said second leg, with said cantilever arm extending in a substantially circumferential manner toward said tab, and when engaged thereto, said cantilever arm overlays said tab whereby said proximal portion of said tab lies adjacent said distal portion of said cantilever arm and said distal portion of said tab lies adjacent said proximal portion of said cantilever arm, with said retaining clip thereby forming a coupling between the fuel regulator and the fuel rail.

2. A retaining clip as set forth in claim 1, wherein said inner surface of said cantilever arm and said outer surface of said tab both comprise a plurality of serrated catches, such that said cantilever arm catches oppose said tab catches, wherein said catches are adjacently spaced therealong, and wherein said catches are aligned with a longitudinal axis of said body and extend the full axial length of said body.

3. A retaining clip as set forth in claim 1, further comprising a latch formed in a spaced manner from said tab, such that when said tab engages said cantilever arm, said latch substantially secures said tab and said cantilever arm.

4. A retaining clip as set forth in claim 3, with said latch comprising a proximal portion and a distal portion, with said proximal portion being formed adjacent said second end of said second leg, with said latch extending from said proximal portion in a substantially circumferential manner toward said cantilever arm, and when said tab and said cantilever arm are engaged, said distal portion of said latch lies adjacent to said proximal portion of said cantilever arm.

5. A retaining clip as set forth in claim 1, wherein an axially extending notch is formed at an intersection of said inner surfaces of said first and second legs, such that said retaining clip can flex thereabout.

6. A fuel delivery system for an internal combustion engine, said system comprising:
- a fuel rail for supplying fuel and power to a plurality of fuel injectors of said engine, said fuel rail having a radially outward directed lip;
- a fuel regulator for regulating said fuel supply, said fuel regulator having a radially outward directed lip;
- a pliable retaining clip for securing a fuel regulator having a radially outward directed lip to a fuel rail, also having a radially outward directed lip, said retaining clip, when attached, having an axis that is coincident with the axis of said fuel regulator and said fuel rail, said retaining clip comprising:
  - a first arcuately shaped leg having a first end, a second end, an inner surface and an outer surface;
  - a second arcuately shaped leg having a first end, a second end, an inner surface and an outer surface, with said first and said second legs being joined together at said first ends;
  - a channel formed in said inner surfaces of said first and second legs, with said channel being adapted to engage with the lips of the fuel regulator and the fuel rail;
  - a cantilever arm extending from said outer surface of said first leg at said second end thereof, with said cantilever arm comprising a proximal portion and a distal portion, with said proximal portion being formed adjacent said second end of said first leg;
  - a tab extending along said outer surface of said second leg for cooperating with said cantilever arm to engage thereto, with said tab comprising a proximal portion and a distal portion, with said proximal portion being formed adjacent said second end of said second leg, with said cantilever arm extending in a substantially circumferential manner toward said tab, and when engaged thereto, said cantilever arm overlays said tab whereby said proximal portion of said tab lies adjacent said distal portion of said cantilever arm and said distal portion of said tab lies adjacent said proximal portion of said cantilever arm, with said retaining clip thereby forming a coupling between the fuel regulator and the fuel rail.

7. A fuel delivery system as set forth in claim 6, wherein said inner surface of said cantilever arm and said outer surface of said tab both comprise a plurality of serrated catches, such that said cantilever arm catches oppose said tab catches, wherein said catches are adjacently spaced therealong, and wherein said catches are aligned with a longitudinal axis of said body and extend the full axial length of said body.

8. A fuel delivery system as set forth in claim 6, further comprising a latch formed in a spaced manner from said tab, such that when said tab engages said cantilever arm, said latch substantially secures said tab and said cantilever arm.

9. A fuel delivery system as set forth in claim 8, with said latch comprising a proximal portion and a distal portion, with said proximal portion being formed adjacent said second end of said second leg, with said latch extending from said proximal portion in a substantially circumferential manner toward said cantilever arm, and when said tab and said cantilever arm are engaged, said distal portion of said latch lies adjacent to said proximal portion of said cantilever arm.

10. A fuel delivery system as set forth in claim 6, wherein an axially extending notch is formed at an intersection of said inner surfaces of said first and second legs, such that said retaining clip can flex thereabout.

11. A pliable retaining clip for securing a fuel regulator having a radially outward directed lip to a fuel rail, also having a radially outward directed lip, said retaining clip, when attached, having an axis that is coincident with the axis of said fuel regulator and said fuel rail, said retaining clip comprising:
- a first arcuately shaped leg having a first end, a second end, an inner surface and an outer surface;
- a second arcuately shaped leg having a first end, a second end, an inner surface and an outer surface, with said first and said second legs being joined together at said first ends;
- a channel formed in said inner surfaces of said first and second legs, with said channel being adapted to engage with the lips of the fuel regulator and the fuel rail;
- a cantilever arm extending from said outer surface of said first leg at said second end thereof, with said cantilever arm comprising a proximal portion and a distal portion, with said proximal portion being formed adjacent said second end of said first leg;
- a tab extending along said outer surface of said second leg for cooperating with said cantilever arm to engage thereto, with said tab comprising a proximal portion and a distal portion, with said proximal portion being formed adjacent said second end of said second leg, with said cantilever arm extending in a substantially circumferential manner toward said tab, and when engaged thereto, said cantilever arm overlays said tab whereby said proximal portion of said tab lies adjacent said distal portion of said cantilever arm and said distal portion of said tab lies adjacent said proximal portion of said cantilever arm, with said retaining clip thereby forming a coupling between the fuel regulator and the fuel rail;
- a plurality of serrated catches spaced adjacently along said inner surface of said cantilever arm and said outer surface of said tab, such that said cantilever arm catches oppose said tab catches, wherein said catches are aligned with a longitudinal axis of said body and extend the full axial length of said body;
- a latch formed in a spaced manner from said tab, with said latch comprising a proximal portion and a distal portion, with said proximal portion being formed adjacent said second end of said second leg, with said latch extending from said proximal portion in a substantially circumferential manner toward said cantilever arm, such that when said tab engages said cantilever arm, said latch secures said tab and said cantilever arm, and wherein said distal portion of said latch lies adjacent to said proximal portion of said cantilever arm;

an axially extending notch is formed at an intersection of said inner surfaces of said first and second legs, such that said retaining clip can flex thereabout.

12. A retaining clip for securing a fuel regulator having a radially outward directed lip to a fuel rail, also having a radially outward directed lip, said retaining clip, when attached, having an axis that is coincident with the axis of the fuel regulator and the fuel rail, said retaining clip comprising:

an annularly formed body;

a cylindrical wall extending axially from the outer circumference of said annularly formed body;

a plurality of cantilever arms extending axially from said cylindrical wall, with said cantilever arms comprising a proximal portion and a distal portion, with said arms engaging the lips of the fuel rail and the fuel regulator when said retaining clip is inserted thereon.

13. A retaining clip as set forth in claim 12, further comprising a plurality of radially extending openings symmetrically spaced along said cylindrical wall, wherein said cantilever arms are located centrally within said openings.

14. A retaining clip as set forth in claim 13, wherein said openings substantially encompass said axial extent of said cylindrical wall.

15. A retaining clip as set forth in claim 12, wherein said distal portions of each said cantilever arm comprises a radially inward directed tab.

* * * * *